US009276964B2

(12) United States Patent
Stille et al.

(10) Patent No.: US 9,276,964 B2
(45) Date of Patent: Mar. 1, 2016

(54) METHOD AND USER TERMINAL FOR SUPPORTING PROVISION OF CAPABILITIES

(71) Applicant: Telefonaktiebolaget L M Ericsson (publ), Stockholm (SE)

(72) Inventors: Mats Stille, Bromma (SE); Nancy M. Greene, Outremont (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 261 days.

(21) Appl. No.: 13/890,773

(22) Filed: May 9, 2013

(65) Prior Publication Data

US 2013/0287016 A1 Oct. 31, 2013

Related U.S. Application Data

(60) Provisional application No. 61/645,684, filed on May 11, 2012.

(30) Foreign Application Priority Data

May 11, 2012 (EP) .................................... 12167677

(51) Int. Cl.
*H04L 5/14* (2006.01)
*H04L 29/06* (2006.01)
*H04L 29/08* (2006.01)
*H04W 12/02* (2009.01)

(52) U.S. Cl.
CPC .......... *H04L 65/1006* (2013.01); *H04L 63/205* (2013.01); *H04L 65/1016* (2013.01); *H04L 65/1059* (2013.01); *H04L 65/1069* (2013.01); *H04L 67/303* (2013.01); *H04L 69/24* (2013.01); *H04W 12/02* (2013.01)

(58) Field of Classification Search
CPC . H04L 47/10; H04L 2012/5631; H04L 47/15; H04L 47/2441; H04L 47/70; H04L 12/5602; H04L 47/27; H04L 2012/5635; H04L 47/35; H04L 47/30; H04L 47/32; H04L 65/1006; H04L 65/1016; H04L 67/303; H04L 65/1069; H04L 65/1059; H04L 69/24; H04L 63/205; H04W 12/02
USPC .......................... 370/230, 231, 235, 349, 389
See application file for complete search history.

(56) References Cited

U.S. PATENT DOCUMENTS

| | | | |
|---|---|---|---|
| 2004/0095938 A1* | 5/2004 | Ryu | ............................. 370/392 |
| 2004/0225679 A1 | 11/2004 | Oran | |
| 2008/0192733 A1* | 8/2008 | Song et al. | ................... 370/352 |
| 2008/0263210 A1 | 10/2008 | Song et al. | |
| 2009/0311997 A1* | 12/2009 | Fried et al. | ................. 455/414.3 |

OTHER PUBLICATIONS

Author Unknown. "Rich Communication Suite." GSM Association, RCS Technical Realization, Release 1, Dec. 4, 2008, pp. 1-34.

* cited by examiner

*Primary Examiner* — Brenda H Pham
(74) *Attorney, Agent, or Firm* — Coats & Bennett, P.L.L.C.

(57) ABSTRACT

A method in a first user terminal (300, 500) for supporting provision of capabilities of the first user terminal to a second user terminal (302) is provided.
The method comprises receipt (402) of a capability request from the second user terminal. Upon receipt of the capability request, filtering rules are used (406) on the capabilities of the first user terminal, wherein the filtering rules have been pre-configured for the first user terminal to control exposure of said capabilities. Thereafter a capability message is transmitted (408) to the second user terminal, wherein at least one of the capabilities of the first user terminal have been omitted from the capability message based on the filtering rules.

20 Claims, 3 Drawing Sheets

METHOD AND USER TERMINAL FOR SUPPORTING PROVISION OF CAPABILITIES

This application claims the benefit of European Patent Application No. 12167677.9, filed on 11 May 2012, and U.S. Provisional Patent Application Ser. No. 61/645,684, filed on 11 May 2012, the contents of which are incorporated herein by reference.

TECHNICAL FIELD

The present disclosure relates generally to a method and a user terminal for supporting provision of capabilities.

BACKGROUND

In modern user terminals for communication, there are typically multiple options available for communication and usage of services in a communication network. For example, a user terminal may be capable of supporting several different types of communication such as voice calls, video telephony, messaging based on Short Message Service (SMS) and Multimedia Message Service (MMS), text chats, file sharing, video sharing, online games, and also different encoding schemes and protocols, to mention a few illustrative examples. In this description, the term "capabilities" basically refers to such communication types, encoding schemes and protocols.

A network architecture called "IP Multimedia Subsystem" (IMS) has been developed to enable such differentiated services and sessions for user terminals connected to different access networks. The signalling protocol " Session Initiation Protocol" (SIP) can further be used for initiating and controlling communication sessions between different entities, as controlled by specific session control nodes in the IMS network, sometimes referred to as Call Session Control Function (CSCF) nodes. IMS also allows a user to have more than one terminal that can be addressed by the same identity, typically a telephone number.

There is thus a mixture of different user terminals in use today, having more or less differentiated capabilities, and when two user terminals shall execute some communication with each other, it is a common practice that they compare their capabilities first in order to know which type of communication is available for these two particular terminals. The communication type to use must be supported by both terminals, otherwise it cannot be used.

In the following description, the term "user terminal" is used to represent any terminal, user equipment, device, etc. which is capable of communication with an opposite entity such as another user terminal over a communications network. Some non-limiting examples of user terminals that can be used in this context include mobile phones, smartphones, laptop computers, tablets, television units, media players, and game consoles. Each of these terminal categories includes in turn a myriad of different brands and models with different functions and communication possibilities.

One existing mechanism for exchanging capabilities between entities is the so-called "SIP Options" method, which is schematically illustrated in FIG. 1. In this example, an originating user terminal 100 sends a SIP Options message towards a terminating user terminal 102, in an action 1:1, which message is routed over a session control node 106 in a network 104 for communication services. For example, the network 104 may be an IMS network and the session control node 106 may be a CSCF node comprised therein. The SIP Options message may be triggered in terminal 100 when a user selects a contact of terminal 102 in preparation of a forthcoming session.

In particular, the SIP Options message from terminal 100 may include the capabilities of terminal 100, e.g. presented basically in the form of a list or record indicating which communication types the terminal 100 is capable of using. The opposite user terminal 102 conventionally responds by returning a so-called "200 OK" message to terminal 100, in an action 1:2, which typically always includes the capabilities of terminal 102 indicating which communication types the terminal 102 is capable of using. Thereby, the capabilities of the terminals 100, 102 have been exchanged and each terminal can determine which communication types are possible to use, i.e. those supported by both terminals. The capabilities of either terminal are thus exposed in this way at the opposite side and the available communication options can also be displayed on the terminals 100, 102, e.g. by showing or lightening corresponding icons or the like on the screen, such that their respective users can easily see which options are available before selecting and activating a communication type to use.

GSM Association (GSMA) has selected such a capability query mechanism that allows a user of a user terminal with a Rich Communication Suite (RCS) client, to query another user terminal for a complete set of service capabilities. This allows an RCS subscriber to add a phone number into his/her contact book whereby the user terminal automatically queries the capabilities of the terminal belonging to the party associated with said phone number.

Another known mechanism, schematically illustrated in FIG. 2, is to exchange capabilities between two user terminals 200 and 202 by means of a presence service. In this example, the capabilities of terminal 202 are first published in a presence server 204, as illustrated in an action 2:1. The other terminal 200 may do the same, although not shown here for simplicity. The terminal 200 may subscribe to the capability information of terminal 202 and is therefore able to obtain the published capabilities of terminal 202, in another action 2:2, e.g. by fetching them from the presence server 204 or by receiving a notification therefrom. Using common presence terminology, terminal 202 acts as a "presentity" while terminal 200 acts as a "watcher", and vice versa is of course also possible.

In this case, it is not necessary to exchange capabilities in specific request and response messages between the terminals 200, 202, as in the above SIP Option method. Once retrieved, the capabilities of terminal 202 are known and used by terminal 200 to determine which types of communication are possible to use, and corresponding icons or the like may be displayed on the screen of terminal 200 indicating to its user which options are available. The user of terminal 200 can thus select and activate an available communication type, and a session request or the like is then issued to terminal 202 over a session control node 206, in an action 2:3. Terminal 202 will then respond accordingly to the session request in another shown action 2:4.

However, there are some drawbacks associated with the above procedures. A user may not be willing to expose his/her terminal(s) for starting, e.g., a video call or a text chat with anybody, depending on the current situation and/or depending on who is calling which could be a totally unknown person. One possibility often used to avoid unwanted calls is to block the terminal altogether from incoming calls, which can also be done selectively e.g. using so-called "black lists" or "white lists". Still, when using the SIP Options method of FIG. 1, the capabilities of one or more terminals associated with an identity such as a called number are automatically exposed at the opposite calling terminal in a way that cannot be controlled, which can be perceived by the called user as an intrusion of privacy. It is possible for an illicit party to gain knowledge of the characteristics and current state of a user's terminals and their locations simply by making capability requests according to the SIP Option method, e.g. for planning some malicious attack.

Even if the presence method of FIG. 2 provides some flexibility in that the terminal user can select which capabilities to expose by publication, this method is deemed somewhat taxing and costly by requiring establishment of a presence service. Further, the published capability information may be out of date or misleading, e.g. if the capabilities have not been updated or properly published in the presence server by the user as required, or if the terminal is currently in a situation which is not suitable for some of the published communication types such as when a mobile terminal is present in an area with very limited bandwidth, or when the user's terminal is simply turned off or otherwise unavailable for one or more communication types.

SUMMARY

The present disclosure relates to mechanisms to address at least some of the problems and issues outlined above, and to enable a terminal user to control whether the capabilities of his/her user terminal and corresponding options for communication will be exposed at an opposite user terminal.

According to one aspect, a method is provided in a first user terminal for supporting provision of capabilities of a first user terminal to a second user terminal. The method comprises receipt of a capability request from the second user terminal. Upon receipt of the capability request, filtering rules are used on the capabilities of the first user terminal, wherein the filtering rules have been pre-configured for the first user terminal to control exposure of said capabilities. Thereafter a capability message is transmitted to the second user terminal, wherein at least one of the capabilities of the first user terminal have been omitted from the capability message based on the filtering rules.

According to another aspect, a first user terminal is configured to support provision of capabilities of the first user terminal to a second user terminal. The first user terminal comprises a receiving unit that is configured to receive a capability request from the second user terminal. The first user terminal further comprises a logic unit configured to use filtering rules on the capabilities of the first user terminal, wherein the filtering rules have been pre-configured for the first user terminal to control exposure of said capabilities. The first user terminal still further comprises a transmitting unit configured to transmit a capability message to the second user terminal, wherein at least one of the capabilities of the first user terminal have been omitted based on the filtering rules.

With the above method and user terminal, the user of the first user terminal is able to control the exposure of terminal capabilities and corresponding options for communication at any opposite user terminal receiving the capability message, by pre-configuring the filtering rules in any desired manner. For example, if the user does not want to expose a particular capability and corresponding type of communication depending on the situation, he/she can configure the filtering rules such that this capability will be omitted from the capability message when this situation occurs.

The above method and user terminal may be configured and implemented according to different optional embodiments which are possible to select and combine in any suitable manner depending on implementation. Further possible features and benefits of this solution will become apparent from the detailed description below.

BRIEF DESCRIPTION OF DRAWINGS

The solution will now be described in more detail by means of exemplary embodiments and with reference to the accompanying drawings, in which.

DETAILED DESCRIPTION

Figure 1:
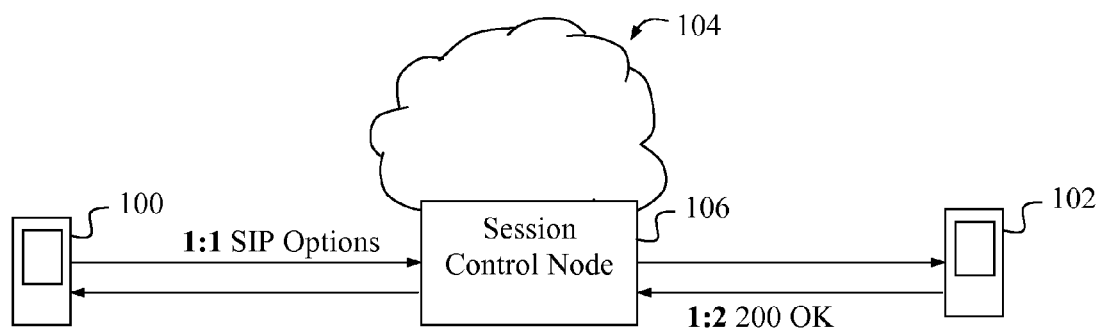
FIG. 1 is a communication scenario illustrating the SIP Options method for provision of capabilities, according to the prior art.
Figure 2:
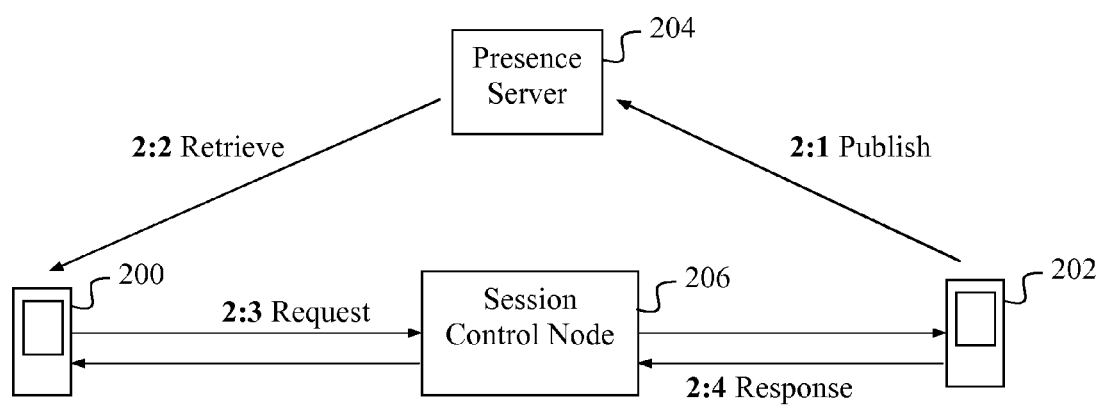
FIG. 2 is a communication scenario illustrating the presence service method for provision of capabilities, according to the prior art.

Briefly described, a solution is provided to enable a user of a first user terminal to control the exposure of capabilities to a second user terminal by configuring filtering rules in a user terminal. Before the first user terminal issues a capability message directed to a second user terminal, e.g. using the SIP Options method, the message is filtered using previously configured filtering rules whereby the capability message is modified by omitting at least one of the capabilities based on the filtering rules. Thereby, the modified capability message will contain a reduced set of capabilities when transmitted to the second user terminal. The filtering rules can be pre-configured in any manner by the user to filter out one or more capabilities depending on the situation, which will be described in more detail below. It is also possible that the filtering rules could dictate that no capabilities should be left in the message at all.

In this description, the term "capability message" is used to represent any message sent from a first user terminal to another communication entity in response to a capability request received from the another communication entity, such as another user terminal like in the examples below. Depending on the filtering rules the capability message contains all or less information on capabilities of the first user terminal. Some examples of a capability message include the above-described messages SIP Options and 200 OK, although the solution is not limited to any particular capability messages. By configuring the filtering rules in the user terminal, the terminal user is able to control if, how and when his/her terminal's capabilities will be exposed in any opposite communication entities. It is an advantage that the user is thereby able to pre-configure such filtering rules to obtain tailored and personalized exposure of terminal capabilities in opposite terminals and entities in a relatively easy and reliable way. In this context, exposure of terminal capabilities is typically done by displaying corresponding options for communication, i.e. the available types of communication such as voice, video, chat, messaging, file transfer, etc., on the opposite terminal's screen.

The pre-configured filtering rules may pertain to the current time or day, or to the type of service such that certain types of services should be exposed but not others depending on the situation. According to other possible examples, the filtering rules may pertain to the identity of a user of the second user terminal. For example, the filtering rules may be configured such that the option of a voice call should be exposed to any opposite party while the option of a video call, a text chat, etc. should be exposed only to a set of parties known to the user but not to other e.g. unknown parties. Whether a party is known or unknown to the user can e.g. be determined by checking if the party is included in a contact book of the first user terminal.

In another example a capability privacy parameter may be set in the user terminal, the parameter indicating whether the pre-configured filtering rules are to be applied or not. When the parameter is set the filtering rules shall be used and applied on the capability message transmitted to the second user terminal. E.g. if it is determined that no capabilities shall be provided to the second user terminal, the first user terminal may either return a positive response without including any feature tags at all in a contact header of a SIP 200 OK message, or respond negatively by transmitting a SIP 488 message (not accepted here) or a SIP 501 message (not implemented). However, if the parameter is not set, according to this example, the filtering rules shall not be used and all capabilities of the user terminal will be exposed in the capability message, by e.g. including feature tags in a contact header of a SIP 200 OK message, where each feature tag identifies each supported service capability of the terminal.

The capability privacy parameter may also pertain to an identity of a user of the second user terminal. Even though a party is known to a user, the user may not want to expose all capabilities to said party. A user may e.g. keep a contact book comprising a large number of contacts ranging from close personal contacts such as family and close friends, to more remote contacts including colleagues, customers and craftsmen. By setting the capability privacy parameter individually per contact, the user is able determine which parties of the contact book that should receive a filtered version of the capabilities and which should receive a complete version. Further, different filtering rules may apply to different parties such that for party A the option of a video call is omitted, and for party B the option of a text chat is omitted.

In yet another example, the configured filtering rules may pertain to a current status or activity of the first user terminal and its user, such as engaged in a session, on hold, sleeping, in meeting, driving a vehicle, and so forth. The configured filtering rules may also refer to current geographical location of the first user terminal. For example, the option of a video call may be omitted from the capability message when located at work or in an area not covered by the user's home network. In general, the filtering rules may be configured so as to pertain to any of the above factors, or any combination thereof.

Figure 3:
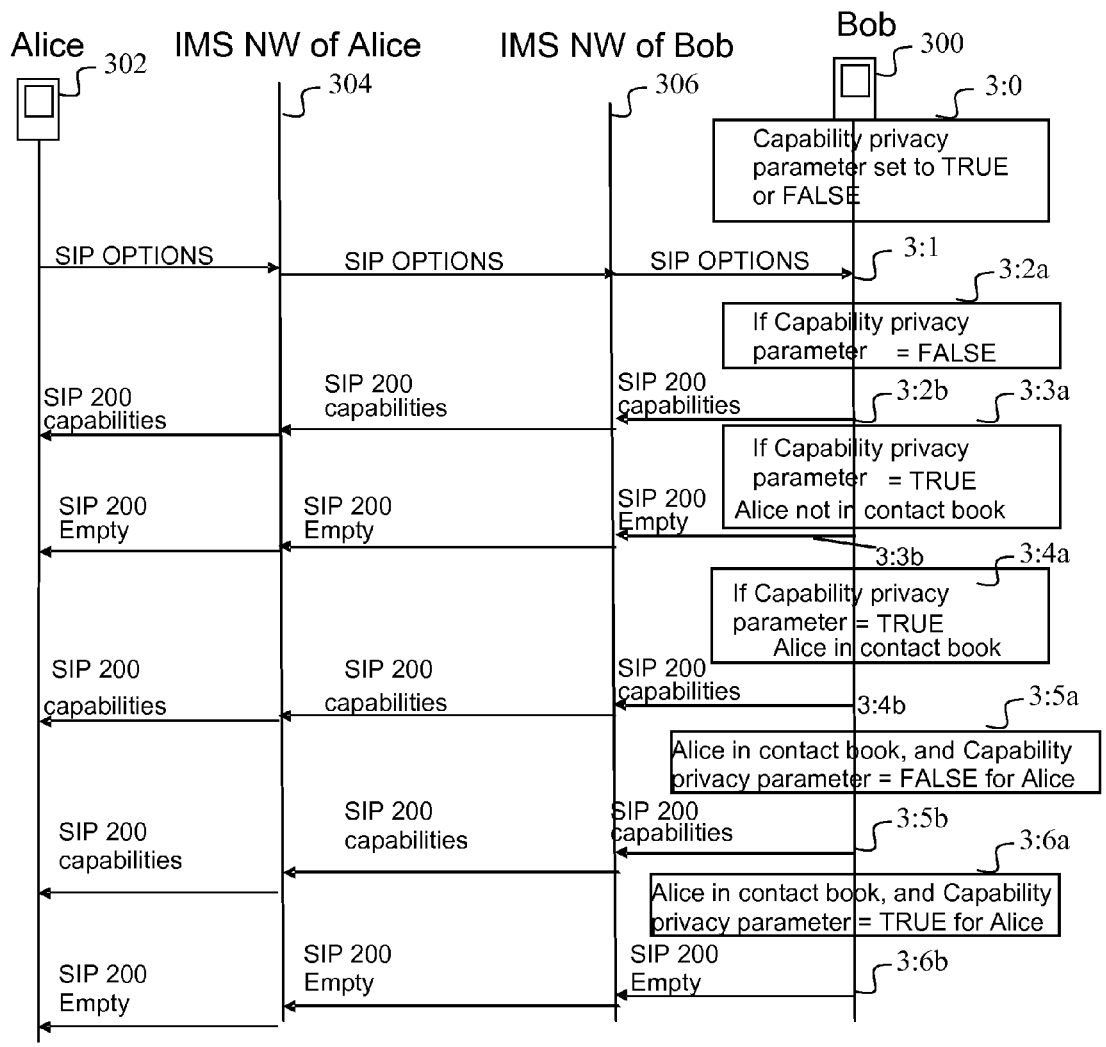
FIG. 3 is a communication scenario illustrating how capabilities can be provided from a user terminal in a communication services network, according to some possible embodiments.

Some examples of how the solution may be used in a user terminal 300 in a communication services network 306, will now be described with reference to FIG. 3. In FIG. 3, a first user terminal 300 in an IMS network 306 will receive a request for capabilities from a second user terminal 302 in an IMS network 304. Before receiving the request, a first action 3:0 schematically illustrates that filtering rules are pre-configured in the user terminal 300 by the user to control exposure of terminal capabilities. This configuration could be executed from a client or the like in the first user terminal or from any computer by means of a downloadable application or an interactive web interface operated by the user, Bob. The filtering rules may also be pre-configured by an operator, by e.g. sending the configuration in a text configuration message such as a Short Message Service, SMS. In either case, the filtering rules have now been pre-configured in the user terminal 300. According to one embodiment a capability privacy parameter is set, indicating whether the filtering rules are to be applied or not. The parameter may be a Boolean type parameter which, when set to TRUE, indicates that the filtering rules shall apply and when set to FALSE indicates that the filtering rules shall not apply.

A next action 3:1 illustrates that the second user terminal 302 has transmitted a capability request which is received by the first user terminal 300. The capability request was triggered by the user, Alice, of the second user terminal, 302, making some input command, such as entering a telephone number and may be an above-described SIP Options message. This capability request may contain capabilities of the second user terminal 302, and may be modified in the way described in the examples below or unmodified without applying any filtering rules. It is also a possibility that the capability request does not contain any capabilities of the second user terminal.

The following actions 3:2a, 3:2b, 3:3a, 3:3b, 3:4a, 3:4b, 3:5a, 3:5b, 3:6a and 3:6b refer to different examples of handling the capability request depending on how the filtering rules are implemented.

In a first example, when receiving the capability request, the first user terminal 300 applies the pre-configured filtering rules, in an action 3:2a. However, in this example no filtering rules will apply to the capability message since the capability privacy parameter is set to FALSE. Consequently the capability message transmitted in action 3:2b in reply to the capability request is a SIP 200 message comprising all capabilities of the user terminal 300.

In a second example, when receiving the capability request, the first user terminal 300 applies the pre-configured filtering rules, in an action 3:3a. In this example the capability privacy parameter is set to TRUE, indicating that filtering rules shall be applied to capability messages transmitted from the user terminal.

The configuration of the filtering rules pertains to the identity of Alice, in that a check is performed whether Alice is present in a contact book of the first user terminal 300, or not. Since Alice is not included in the contact book the filtering rules will apply, and since the filtering rules in this example are configured in an "all-or-nothing" manner, the capability message transmitted in action 3:3b in reply to the capability request is an empty SIP 200 message comprising no information regarding capabilities of the user terminal 300. As an alternative to an empty SIP 200 message a negative response message such as a SIP 488 message (not accepted here) or a SIP 501 (not implemented) may be transmitted. As mentioned above the filtering rules may be configured in various ways, and instead of transmitting an empty SIP 200 message, certain types of services may be exposed but not others depending on the situation and/or the identity of the requesting user.

In a third example, when receiving the capability request, the first user terminal 300 applies the pre-configured filtering rules, in an action 3:4a. In this example the capability privacy parameter is set to TRUE, indicating that filtering rules shall be applied to capability messages transmitted from the user terminal. The configuration of the filtering rules pertains to the identity of Alice, in that a check is performed whether Alice is present in a contact book of the first user terminal 300, or not. Since Alice is included in the contact book the filtering rules will in this example not apply. The capability message transmitted in action 3:4b in reply to the capability request is thus a SIP 200 message comprising all capabilities of the user terminal 300.

In a fourth example, when receiving the capability request, the first user terminal 300 applies the pre-configured filtering rules, in an action 3:5*a*. This example differs from the previous examples in that the first check that is performed is whether Alice is present in the contact book or not. Thereafter, since Alice is included in the contact book, a check is performed regarding whether the capability privacy parameter is set for Alice or not. The capability privacy parameter is set to FALSE, indicating that no filtering rules shall be applied to capability messages transmitted to Alice from the user terminal. The capability message transmitted in action 3:5*b* in reply to the capability request is thus is a SIP 200 message comprising all capabilities of the user terminal 300.

In a fifth example, similar to the fourth example above, when receiving the capability request, the first user terminal 300 applies the pre-configured filtering rules, in an action 3:6*a*. The first check that is performed is whether Alice is present in the contact book or not. Thereafter, since Alice is included in the contact book, a check is performed regarding whether the capability privacy parameter is set for Alice or not. The capability privacy parameter is set to TRUE, indicating that filtering rules shall be applied to capability messages transmitted to Alice from the user terminal. The capability message transmitted in action 3:6*b* in reply to the capability request is thus a capability message modified such that at least one of the capabilities have been omitted based on the filtering rules, e.g. an empty SIP 200 message.

As mentioned above, it is possible that all capabilities are omitted from the message depending on the filtering rules and the current situation. It may also happen in some cases that the filtering rules allow all capabilities to be exposed at the opposite terminal, i.e. no capability needs to be omitted according to the rules, which is however outside the scope of these examples.

By using the solution exemplified by the above examples shown in FIG. 3, the user of the first user terminal 300 can control the exposure of terminal capabilities and corresponding options for communication on any opposite user terminal by pre-configuring the filtering rules.

Figure 4:
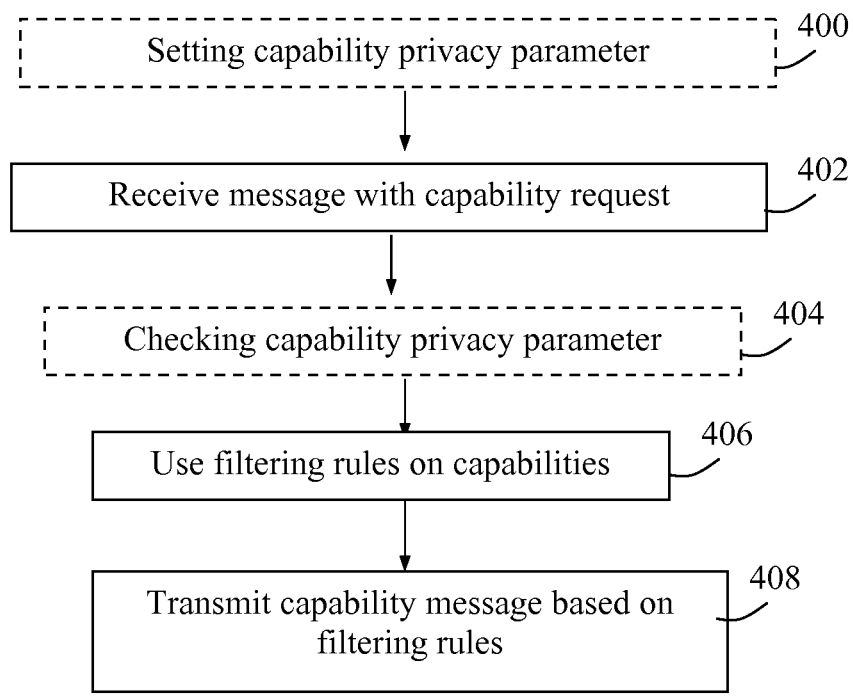
FIG. 4 is a flow chart illustrating a procedure in a user terminal, according to further possible embodiments.

A procedure for supporting provision of capabilities of a first user terminal to a second user terminal, will now be described with reference to the flow chart in FIG. 4 comprising actions executed in a user terminal. It is assumed that filtering rules have been pre-configured in the first user terminal to control exposure of the terminal's capabilities.

In an action 400, a capability privacy parameter is set, indicating whether the filtering rules are to be applied or not. This step is optional in that sense that e.g. an operator may decide that all user terminals shall use filtering rules to all capability messages. Thereby filtering rules would be applied without capability privacy parameter functionality.

In an action 402, the user terminal receives a capability request issued by the second user terminal and directed to the first user terminal, basically corresponding to action 3:1 above. The received capability request comprising capabilities of the second user terminal e.g. in the form of a SIP Options message.

In an action 404, which takes place in case the functionality of a capability privacy parameter is used, it is checked whether the capability privacy parameter is set or not. If set, it indicates that the filtering rules shall be used on the capabilities of the user terminal.

The user terminal then, in a next action 406, applies the previously pre-configured filtering rules on the capabilities of the first user terminal and thus modifies the capabilities that are to be exposed in the capability message to be transmitted in reply to the capability request. Actions 404 and 406 are basically corresponding to actions 3:2*a*, 3:3*a*, 3:4*a*, 3:5*a* and 3:6*a* above.

The user terminal then transmits the capability message towards the second user terminal, in a final shown action 408, basically corresponding to actions 3:2*b*, 3:3*b*, 3:4*b*, 3:5*b* and 3:6*b* above.

Figure 5:
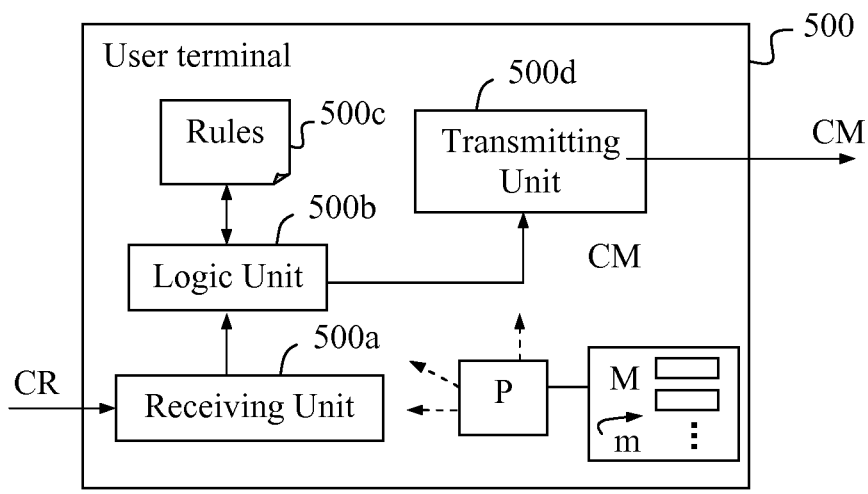
FIG. 5 is a block diagram illustrating a user terminal according to possible embodiments.

A detailed but non-limiting example of how a user terminal can be configured to accomplish the above-described solution, is illustrated by the block diagram in FIG. 5. The user terminal 500 is configured to support provision of capabilities of a first user terminal to a second user terminal, not specifically shown here, e.g. according to the procedures described above for FIGS. 3-4, respectively. The user terminal 500 will now be described in terms of a possible example of employing the solution. It is assumed that filtering rules 500*c* have been pre-configured in the first user terminal 500 to control exposure of the terminal's capabilities in any opposite user terminal.

The user terminal 500 comprises a receiving unit 500*a* configured to receive a capability request "CR" issued from a second user terminal. The capability request CR may be received from a session control node in a communication services network.

The user terminal 500 also comprises a logic unit 500*b* configured to apply the filtering rules 500*c* on the capabilities of the user terminal. The logic unit 500*b* is further configured to construe a capability message "CM" by applying the filtering rules 500*c* and omitting at least one of the capabilities of the user terminal. The logic unit 500*b* may also be configured to check if a capability privacy parameter is set in order to indicate that said filtering rules shall be applied. The user terminal 500 also comprises a transmitting unit 500*d* configured to transmit the capability message CM towards the second user terminal.

It should be noted that FIG. 5 illustrates various functional units in the user terminal 500 and the skilled person is able to implement these functional units in practice using suitable software and hardware. Thus, the solution is generally not limited to the shown structures of the user terminal 500, and the functional units 500*a-d* may be configured to operate according to any of the features described in this disclosure, where appropriate.

The functional units 500*a-d* described above can be implemented in the user terminal 500 by means of program modules of a respective computer program comprising code means which, when run by a processor "P" causes the user terminal 500 to perform the above-described actions and procedures. The processor P may comprise a single Central Processing Unit (CPU), or could comprise two or more processing units. For example, the processor P may include a general purpose microprocessor, an instruction set processor and/or related chips sets and/or a special purpose microprocessor such as an Application Specific Integrated Circuit (ASIC). The processor P may also comprise a storage for caching purposes.

Each computer program may be carried by a computer program product in the user terminal 500 in the form of a memory "M" having a computer readable medium and being connected to the processor P. The computer program product or memory M thus comprises a computer readable medium on which the computer program is stored e.g. in the form of computer program modules "m". For example, the memory M may be a flash memory, a Random-Access Memory (RAM), a Read-Only Memory (ROM) or an Electrically Erasable Programmable ROM (EEPROM), and the program modules m could in alternative embodiments be distributed on different computer program products in the form of memories within the user terminal 500.

While the solution has been described with reference to specific exemplary embodiments, the description is generally only intended to illustrate the inventive concept and should not be taken as limiting the scope of the solution. For example, the terms "user terminal", "capabilities", "capability message and "filtering rules" have been used throughout this description, although any other corresponding nodes, functions, and/or parameters could also be used having the features and characteristics described here. The solution is defined by the appended claims.

The invention claimed is:

1. A method in a first user terminal for supporting provision of capabilities of the first user terminal to a second user terminal, the method comprising:
   receiving a capability request from the second user terminal requesting capabilities that are supported by the first user terminal for communicating with the second user terminal,
   checking if a capability privacy parameter is set, the capability privacy parameter indicating that filtering rules shall be used on the capabilities of the first user terminal,
   using the filtering rules on the capabilities supported by the first user terminal to determine which capabilities to provide to the second user terminal, wherein the filtering rules have been pre-configured for the first user terminal to control exposure of said capabilities, and
   transmitting a capability message to the second user terminal, wherein at least one of the capabilities supported by the first user terminal has been omitted based on the filtering rules, despite the first user terminal actually supporting said at least one of the capabilities.

2. The method according to claim 1, wherein the capability request is a Session Initiation Protocol (SIP) Options message and/or the capability message is a SIP 200 OK message.

3. The method according to claim 1, wherein the capability privacy parameter pertain to an identity of a user of the second user terminal.

4. The method according to claim 3, wherein the capability privacy parameter pertain to an identity of users not present in a contact book of the first user terminal.

5. The method according to claim 3, wherein the capability privacy parameter pertain to an identity of one or more users present in a contact book of the first user terminal.

6. The method according to claim 1, wherein the filtering rules pertain to one or more of:
   a current status or activity of the first user terminal and its user,
   current geographical location of the first user terminal,
   time or day, and
   type of service.

7. The method according to claim 1, wherein the filtering rules are configurable by any of:
   a client in the first user terminal,
   a downloadable application, and
   an interactive web interface.

8. The method of claim 1, wherein the capability request requests the first terminal to indicate whether the first user terminal supports various types of communication, encoding schemes, and/or protocols for communicating with the second user terminal, and the capability message indicates certain supported ones of the various types of communication.

9. The method of claim 1, wherein said capabilities include types of communication supported by the first user terminal, wherein said types include two or more of: voice calls, video telephony, messaging based on a Short Message Service, messaging based on a Multimedia Message Service, text chats, file sharing, video sharing, and online games.

10. The method of claim 1, wherein the received capability request is from an unknown party requesting capabilities that are supported by any recipient user terminal, and wherein the first user terminal is a recipient user terminal.

11. The method of claim 1, wherein the capability request requests all capabilities that are supported by the first user terminal for communicating with the second user terminal.

12. A first user terminal configured to support provision of capabilities of the first user terminal to a second user terminal, the first terminal comprising:
   a receiving circuit configured to receive a capability request from the second user terminal requesting capabilities that are supported by the first user terminal for communicating with the second user terminal,
   a logic circuit configured to:
      check if a capability privacy parameter is set, the capability privacy parameter indicating that filtering rules shall be used on the capabilities of the first user terminal, and
      use the filtering rules on the capabilities supported by the first user terminal to determine which capabilities to provide to the second user terminal, wherein the filtering rules have been pre-configured for the first user terminal to control exposure of said capabilities, and
   a transmitting circuit configured to transmit a capability message to the second user terminal, wherein at least one of the capabilities supported by the first user terminal has been omitted based on the filtering rules, despite the first user terminal actually supporting said at least one of the capabilities.

13. The user terminal according to claim 12, wherein the capability privacy parameter pertains to an identity of a user of the second user terminal.

14. The user terminal according to claim 13, wherein the capability privacy parameter pertains to an identity of users not present in a contact book of the first user terminal.

15. The user terminal according to claim 13, wherein the capability privacy parameter pertains to an identity of one or more users present in a contact book of the first user terminal.

16. The user terminal according to claim 12, wherein the filtering rules are configurable by any of:
   a client in the first user terminal,
   a downloadable application, and
   an interactive web interface.

17. The user terminal according to claim 12, wherein the filtering rules pertain to one or more of:
   a current status or activity of the first user terminal and its user,
   current geographical location of the first user terminal,
   time or day, and
   type of service.

18. The user terminal according to claim 12, wherein the capability request requests the first terminal to indicate whether the first user terminal supports various types of communication, encoding schemes and/or protocols for communicating with the second user terminal, and the capability message indicates certain supported ones of the various types of communication.

19. The user terminal according to claim 12, wherein said capabilities include types of communication supported by the first user terminal, wherein said types include two or more of: voice calls, video telephony, messaging based on a Short Message Service, messaging based on a Multimedia Message Service, text chats, file sharing, video sharing, and online games.

20. The user terminal according to claim 12, wherein the capability request requests all capabilities that are supported by the first user terminal for communicating with the second user terminal.

\* \* \* \* \*